United States Patent [19]

Hackstie et al.

[11] Patent Number: 4,686,403
[45] Date of Patent: Aug. 11, 1987

[54] DYNAMOELECTRIC MACHINE WITH ROCKABLE BEARING SUPPORTS

[75] Inventors: Louis F. Hackstie, Lake Mary, Fla.; Joseph F. Briglia, Primos, Pa.; Albert Cohen, Winter Springs, Fla.

[73] Assignee: Westinghouse Electric Corp., Pittsburgh, Pa.

[21] Appl. No.: 928,149

[22] Filed: Nov. 7, 1986

[51] Int. Cl.⁴ .......................................... F16C 17/06
[52] U.S. Cl. .................................. 310/90; 384/310; 384/311
[58] Field of Search ............... 310/90; 384/309, 310, 384/311, 312, 626

[56] References Cited

U.S. PATENT DOCUMENTS

| | | | |
|---|---|---|---|
| 3,339,990 | 9/1967 | Wendt | 384/311 |
| 3,784,265 | 1/1974 | Cornford | 384/310 |
| 3,917,365 | 11/1975 | Jenness | 384/310 |
| 4,039,228 | 8/1977 | Repose et al. | 384/312 |
| 4,597,676 | 7/1986 | Vohr et al. | 384/311 |

Primary Examiner—Patrick R. Salce
Assistant Examiner—D. L. Rebsch
Attorney, Agent, or Firm—Daniel C. Abeles

[57] ABSTRACT

A dynamoelectric machine has rockable pedestal journal members to support the rotor. The rockable journal members ride on spherical buttons to permit movement. A lower bearing shell supports the rockable members within an outer housing. A key is provided in channels between the lower bearing shell and the outer housing which may be easily removed. Shims may be placed on top of the key as desired to effect positioning of the rotor.

20 Claims, 18 Drawing Figures

DYNAMOELECTRIC MACHINE WITH ROCKABLE BEARING SUPPORTS

Figure 1:
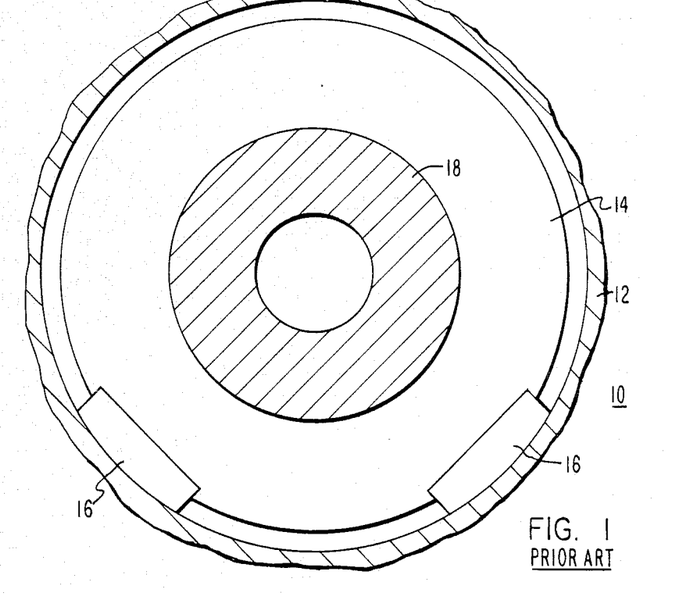
FIG. 1 is a schematic diagram of a prior art bearing for a dynamoelectric machine rotor which uses spherical keys to mate with the housing bore to provide bearing shaft alignment capability.
Figure 2:
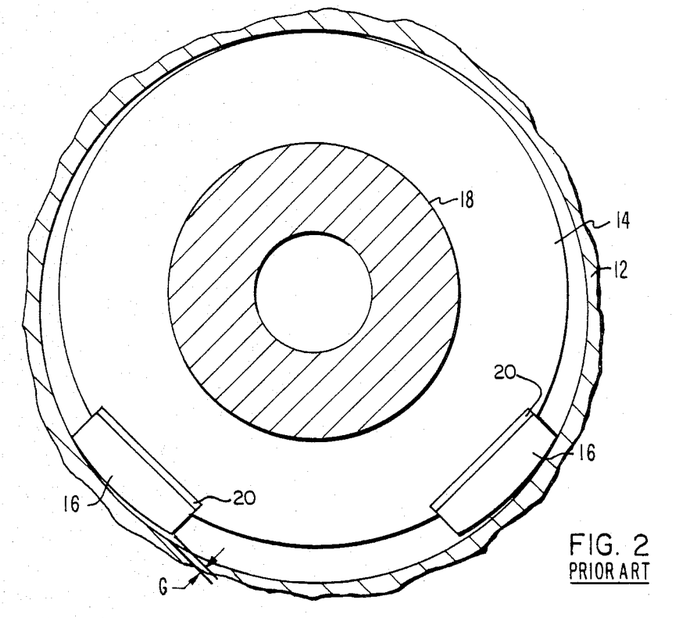
FIG. 2 is a schematic cross-sectional elevational view of the prior art bearing and rotor of FIG. 1 in which a shim has been placed between the spherical keys and the bearing to elevate the rotor to show the disruption of contact of the key with the housing that may occur.

This invention relates to dynamoelectric machines and, particularly, to an improved bearing design for such machines. Dynamoelectris machines that incorperate large rotors, such as large fossil low-pressure steam turbine rotors, are normally supported by sleeve bearings that fit into spherically board housings. Spherical keys are attached to the bearing which mate with the housing bore to form a ball and socket joint, thus providing bearing-to-shaft alignment capability. An example of such a prior art bearing is shown in FIG. 1. Rotor elevation and coupling alignment are controlled by placing shims between the spherical keys and the bearing. It has been found that shimming often disturbs the contact of the keys with the housing and may require time-consuming fitting to restore contact, as shown in FIG. 2. It is obvious that if the contact of the keys with the housing are disturbed, the life expectancy of the key will be greatly shortened.

SUMMARY OF THE INVENTION

The present invention provides a bearing for a dynamoelectric machine having a design that eliminates the need for time-consuming fitting in spherical supports as previoysly discussed.

The present invention is provided in combination with a dynamoelectric machine such as a low-pressure steam turbine. The machine includes a rotor, bearing means in supportive relationship with the rotor. The rotor has journal means for contact with the bearing means.

The improvment of the present invention comprises the bearing means including a hollow cylindrical bearing housing. An upper bearing section is provided for maintaining the rotor in position. The upper bearing section is housed within the bearing housing. A lower bearing section is provided for supporting the rotor.

The lower bearing section includes a lower bearing shell having a U-shaped cross section. The lower bearing shell is housed within the bearing housing. A pair of rockable pedestal journal support members is provided. The journal support members are positioned between the journal portions and the lower bearing shell. The journal support members include an inner journal contact portion and an outer curved position in close proximity to the lower bearing shell.

The journal support members are provided with a first pocket proximate the outer curved portion. The lower bearing shell near the inner surface has a second pocket. The lower bearing shell proximate the outer surface thereof has a first channel axially disposed therein in radial alignment with the second pocket. The housing means proximate the inner surface thereof has a V-shaped groove therein aligned with the second pocket. A first key is disposed within the first pocket and the second pocket for substantially fixing the position of each of the journal support members with respect to the lower bearing shell and the journal portion. The first key includes a curved surface. The journal support member rides on the curved surface of the first key. A second key is disposed within the first channel and the V-shaped groove for preventing the lower bearing shell from rotating and for ease in rotor positioning. Preferably, the second key has a substantially triangular cross section.

In one form of the invention, the upper bearing section desirably includes an upper bearing shell having a U-shaped cross section. The inner surface of the upper bearing shell is in proximity, but does not touch the journal portion.

Preferably, the outer housing proximate the inner surface thereof has second channel means therein. The upper bearing shell proximate the outer surface thereof is provided with third channel means therin. A third key is disposed within the second second channel and the third channel for preventing movement of the upper bearing shell within the housing.

The bearing preferably further comprises shim means disposed between the second key and the lower bearing shell for raising the rotor to any desired position. Preferably, the curved surface of the first key is spherical. The second key desirably includes threaded aperture means therethrough for permitting the second key to be engaged by a bolt so the second key may be easily removed when installing the shims. Preferably, the dynamoelectric machine further comprises flat disk means disposed between the curved surface of the first key and the journal support member. The first key and flat disk are made of tool steel so that the high compressive stress between the two surfaces will not cause permanent deformation and excessive wear.

In the preferred embodiment of the present invention, each of the journal support members further comprise an inner bearing shoe for contacting the journal portion of the rotor. An outer bearing shoe support is desirably included for supporting the inner bearing shoe. The inner bearing shoe has the inner journal contact portion on the inner surface thereof.

Preferably, the lower bearing shell proximate the inner surface thereof has axial groove means therein adjacent the second pocket. Oil blockage seal means are provided substantially disposed within the axial groove means. The oil blockage seals preferably have a triangular cross section. Preferably, the journal support members are provided with tangential oil channels therethrough whereby the oil blockage seal prevents circumferential oil flow between the journal support member and the lower bearing shell to enhance oil flow through the tangential channels to provide cooling for the inner journal portions.

BRIEF DESCRIPTION OF THE DRAWINGS

For a better understanding of the invention reference may be had to the accompanying drawings in which.

DETAILED DESCRIPTION OF THE PREFERRED EMBODIMENTS

Referring to FIG. 1, there is shown a prior art bearing 10. The bearing 10 includes a spherically bored housing 12. The bearing also includes an inner rotatable bearing memeber 14. Spherical keys 16 are fixed with respect to the inner rotatable bearing member 14, and mate with the spherically bored housing 12 to form a type of ball-and-socket joint. Utilizing this arrangement, a shaft 18 is provided with an alignment capability. To elevate the shaft 18, shims 20 are utilized, as shown in FIG. 2. As can be seen from FIG. 2, the shimming often disturbs the contact of the spherical keys 16 with the spherically bored housing 12 as indicated by the arrows G. A great deal of time is often expended to restore proper contact of the spherical keys with the housing bore.

The present invention overcomes the difficulties encountered with the foregoing type of prior art bearing.

Figure 3:
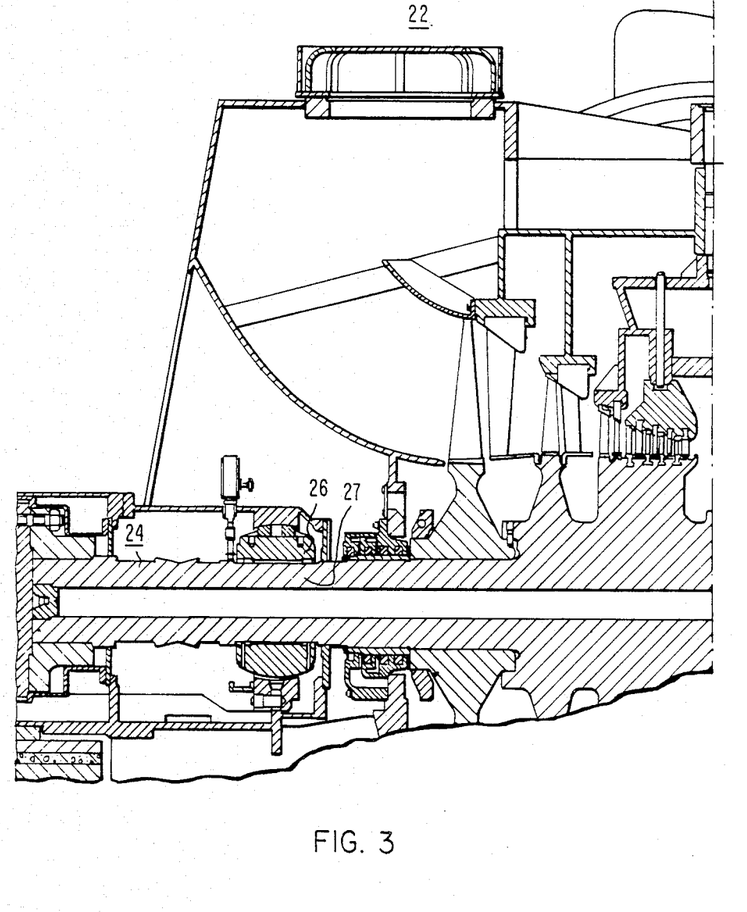
FIG. 3 is a cross-sectional elevational view of a portion of a dynamoelctric machine showing the placement of a bearing in relationship to the journal portion of the rotor.

Referring to FIG. 3, the present invention is provided in combination with a dynamoelectric machine 22 such as a steam turbine, for example. The machine 22 includes a rotor 24. Bearing means 26 are provided in supportive relationship with the rotor 24. The rotor 24 has journal portions 27 for supportive contact with the bearing means 26. The dynamoelectric machine described thus far is conventional. As is well known in the art, the journal portions desirably ride on a thin oil film rather than directly contacting the bearing 26.

Figure 4:
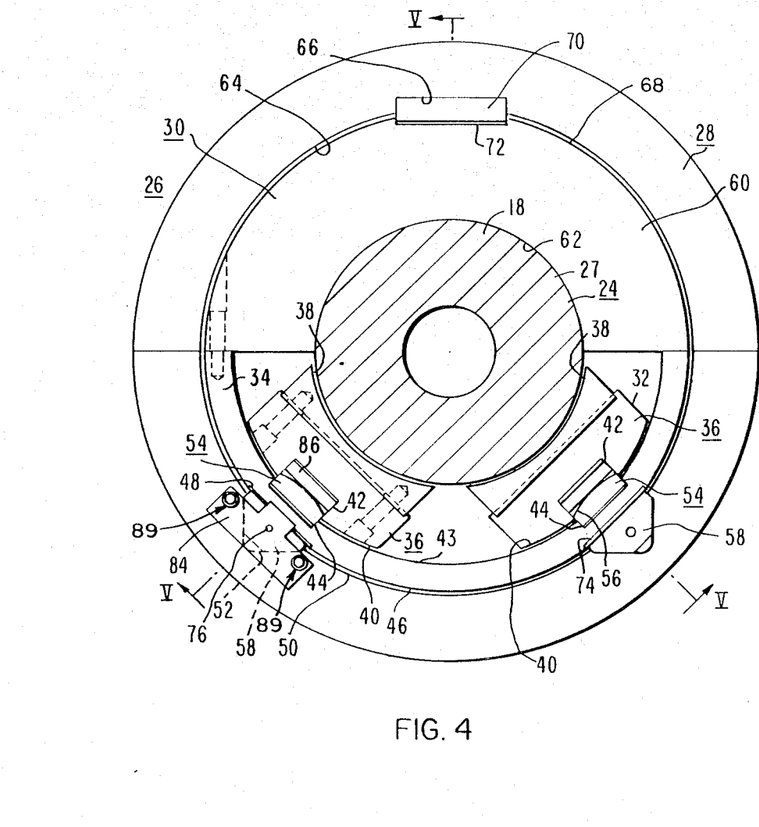
FIG. 4 is a cross-sectional elevatioal view of the bearing of the present invention including the outer housing.
Figure 5:
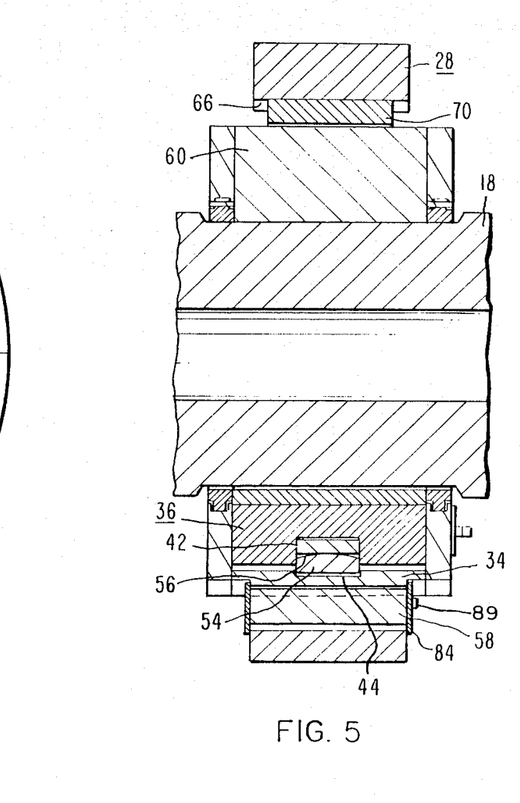
FIG. 5 ia s cross-sectional evelational view taken along the lines V—V of FIG. 4.
Figure 6:
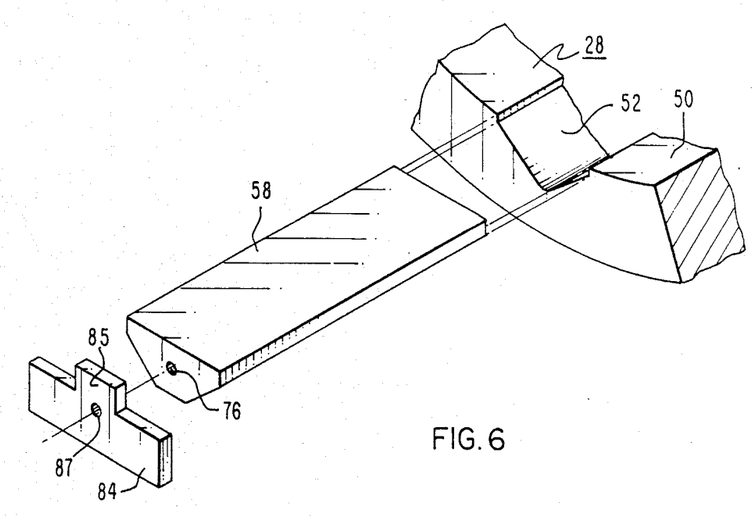
FIG. 6 is an exploded isometric view in the outer housing showing the postion of the end cover member.
Figure 7A:
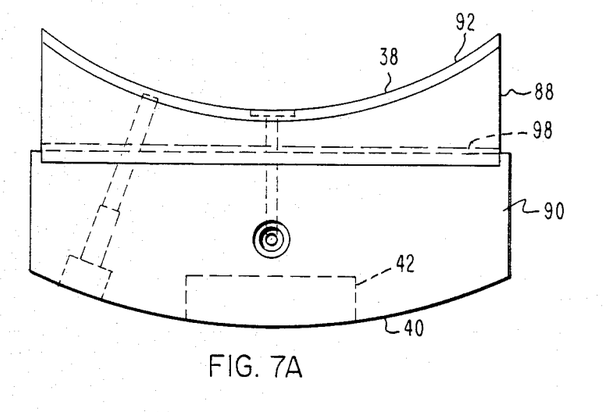
FIG. 7A is an elevational view of the rockable pedestal journal support member of the present invention showing the inner bearing shoe and the outer bearing shoe support.
Figure 7B:
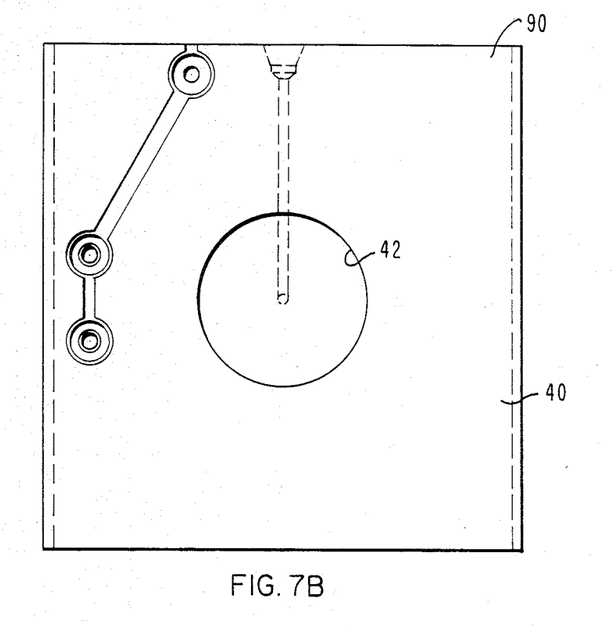
FIG. 7B is a bottom view of the rockable pedestal journal support member shown in FIG. 7A.
Figure 8A:
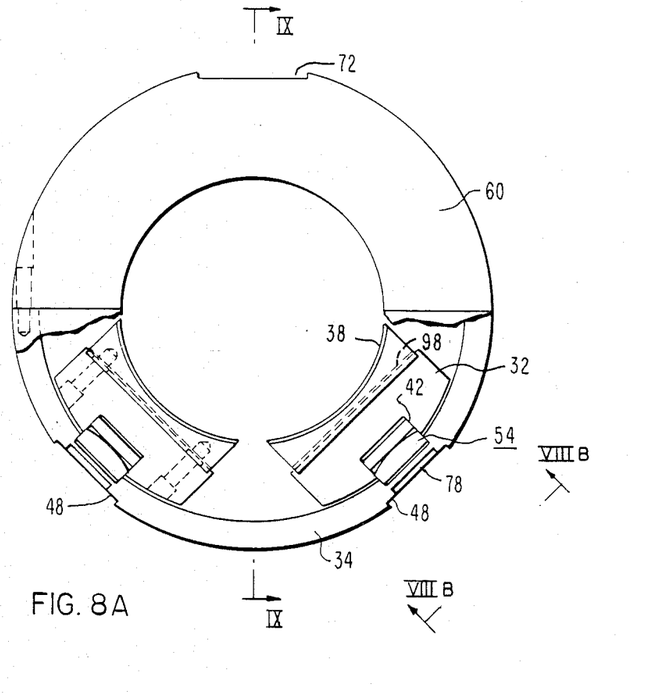
FIG. 8A is a cross-sectional elevational view of the bearing of the present not including the outer housing.
Figure 8B:
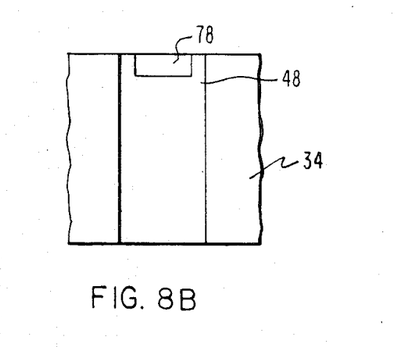
FIG. 8B is a side evelational view looking in along arrow X.
Figure 9:
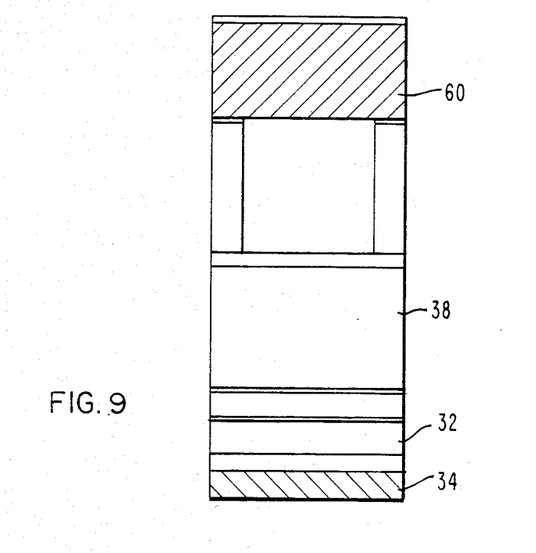
FIG. 9 is a cross-sectional elevational view taken along the line IX—IX of FIG. 8A.

The improvement of the present invention is shown in FIGS. 4-13B comprises the bearing means 26 comprising a hollow cylindrical bearing housing means 28 and an upper bearing section means 30 for maintaining the rotor 24 in position. The upper bearing section means 30 is housed within the bearing housing 28. A lower bearing section means 32 is provided for supporting the rotor 24. The lower bearing section means 32 includes a lower bearing shell 34 having a U-shaped cross section as shown in FIGS. 4 and 10A. The lower bearing shell 34 is housed within the bearing housing 28. A pair of rockable pedestal journal support members 36 are provided. The journal support member 36 are positioned between the journal portion 27 and the lower bearing shell 34. The journal support members 36 include an inner journal contact portion 38 and an outer curved portion 40. The inner journal contact portion 38 is desirably made of babbitt.

The journal support member 36 have a first pocket means 42 therein proximate the outer curved portion 40. The lower bearing shell 34 proximate the inner surface 43 thereof is a second pocket means 44 disposed therein in alignment with the first pocket means 42. The lower bearing shell 34 proximate the outer surface 46 thereof having a first channel means 48 axially disposed therein in radial alignment with the second pocket means 44.

The housing means 28 proximate the inner surface 50 thereof has a V-shaped axial groove means 52 therein in radial alignment with said second pocket means 44. A first key means 54 is disposed within the first pocket 42 and the second pocket 44 for substantially fixing the position of each of the journal support members with respect to the lower bearing shell 34 and the journal portion 27. The first key means 54 includes a curved surface 56. A second key means 58 is disposed within the first channel means 48 and the V-shaped groove 52 providing support for lower bearing section means 32 and for providing ease in adjusting shaft 18 elevation, as hereinafter described, and to prevent rotation of the lower bearing section 32. In a low-pressure steam turbine, the upper section bearing means 30 preferably comprises an upper shell 60 having a U-shaped cross section. The inner surface 62 of the upper shell 60 is in close proximity to the journal portion 27. Preferably, the outer housing 28 proximate the inner surface 64 has second channel means 66 therein. The upper bearing shell 60 proximate the outer surface 68 thereof has third channel means 72 therein. A third key means 70 is disposed within the second channel 66 and the third channel 72 for preventing movement of the upper bearing shell 60 within the housing 28. The third key 70 may be used to compensate for transverse adjustment of the motor by movement within second channel 66. This bolt is not part of the bearing, but is only used as a tool when adjustment of shim 74 is required. It is not shown.

Preferably, the second key means 58 has a substantially triangular cross section. The bearing means 26 desirably further comprises shim means 74 disposed between the second key 58 and the lower bearing shell 34 for raising the rotor 24 to any desired position. Preferably, the curved surface 56 of the first key 54 is spherical.

Another aspect of the present invention provides the second key 58 with a threaded aperture means 76 for permitting the second key 58 to be engaged by a bolt 88 so that the second key 58 may be easily removed when installing a shim 74.

Desirably, the lower bearing shell 34 is provided with first notches 78 in alignment with the first channel 48. A Cover member 84 having tongue portion 85 is provided. The cover member 84 is affixed to the outer housing with bolts 89 such that the tongue portion 85 engages first notch 78. The cover 84 thus maintains the lower bearing shell 34 and second key 58 in position.

Figure 10A:
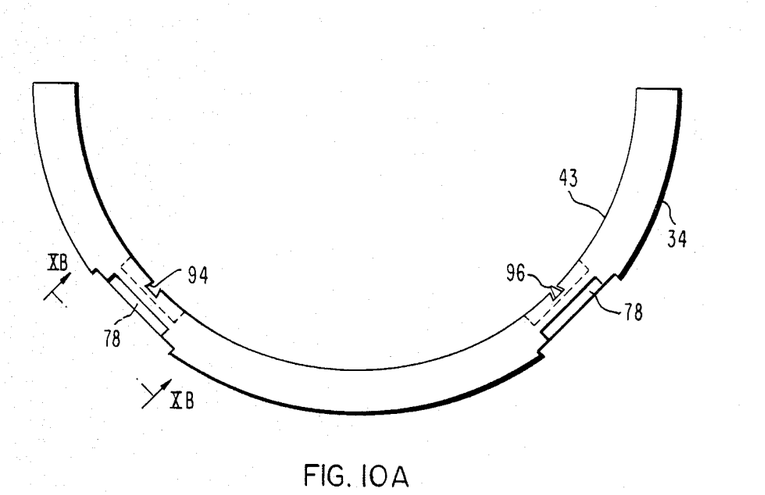
FIG. 10A is an elevational view of the lower bearing shell.
Figure 10B:
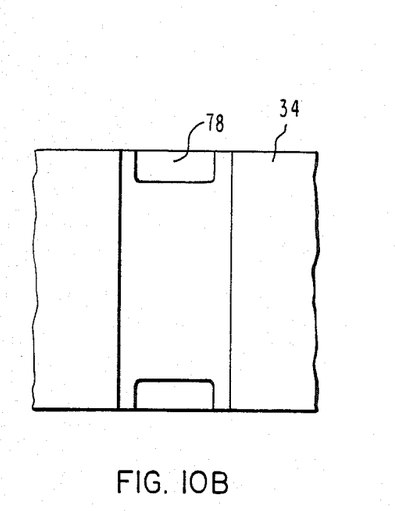
FIG. 10B is a side elevational view looking in along arrow Y of FIG. 10A.
Figure 10C:
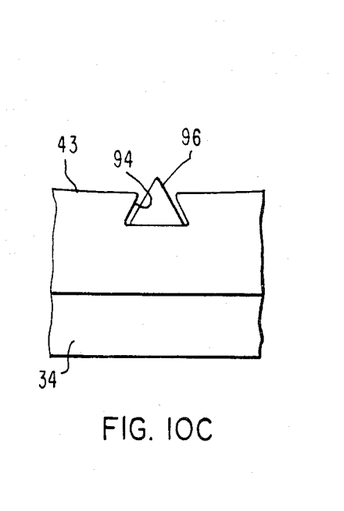
FIG. 10C is an exploded elevational view of a portion of the lower bearing shell showing the axial groove.
Figure 11:
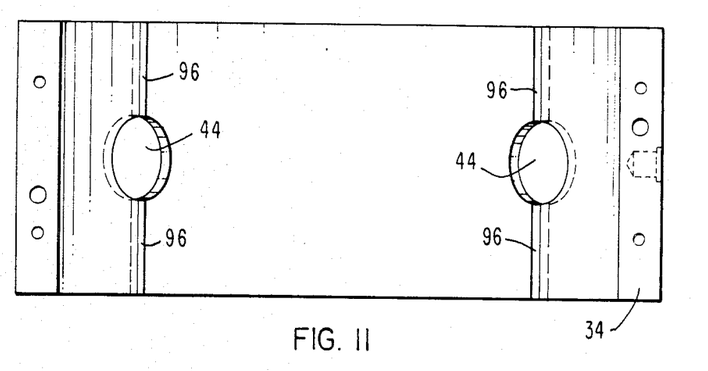
FIG. 11 is a plan view of the lower bearing shell shown in FIG. 10A.
Figure 12:
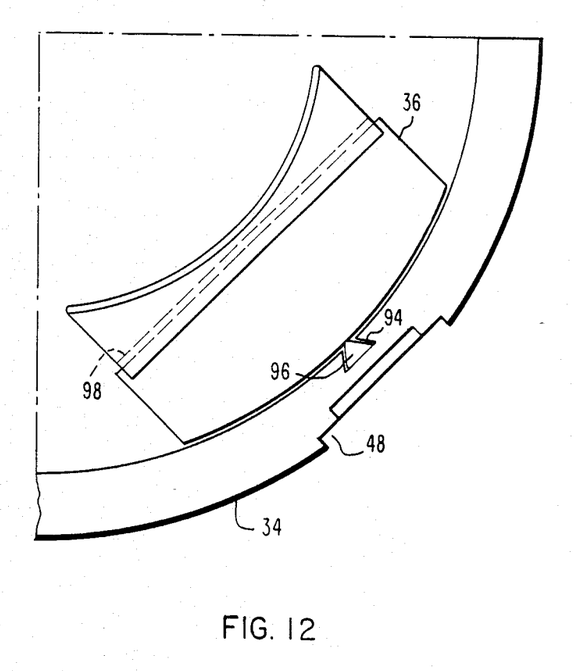
FIG. 12 is an elevational view of a portion of the lower bearing section showing the oil blockage seal.
Figure 13A:
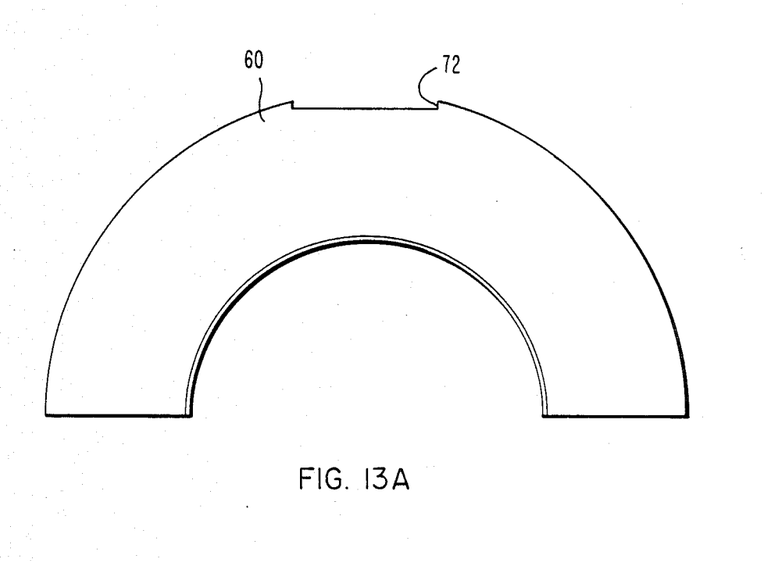
FIG. 13A is an elevational view of the upper bearing shell of the present invention.
Figure 13B:
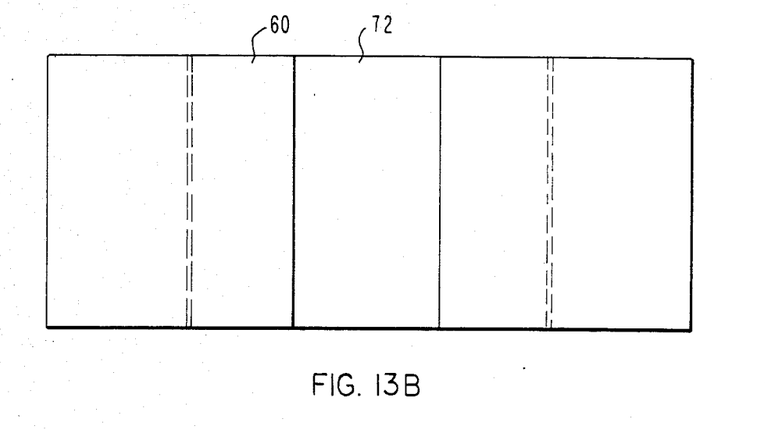
FIG. 13B is a plan view of the upper bearing shell shown in FIG. 13A.

Preferably, the bearing means 26 further comprises flat disk means 86 disposed between the curved surface 56 of the first key 54 and the journal support member 36. The flat disk means 86 is made of tool steel so that the high compressive stress between the surfaces of the first key 54 and the flat disk 86 will not cause permanent deformation or excessive wear. Preferably, each of the journal support members 36 further comprises an inner bearing shoe 88 for contacting the journal portions 27. The inner bearing shoe 88 is preferably made of copper with babbitt lining. The journal support members also comprise an outer bearing shoe support 90. The inner bearing shoe includes inner journal contact portion 38. The outer bearing shoe support includes the outer curved portion 40. Preferably, the lower bearing shell 34 proximate the inner surface 43 thereof includes axial groove means 94 adjacent the second pocket 44. An oil blockage seal means 96 is desirably included substantially disposed within the axial groove 94, as shown in FIGS. 10C, 11 and 12. The journal support members 36 preferably have tangential oil channels 98 therethrough, whereby the oil blockage seals 96 prevent circumferential oil flow between the journal support members 36 and the lower bearing shell 34 to enhance oil flow through the tangential channels 98 to provide cooling for the inner journal portion 38.

We claim:

1. In combination with a dynamoelectric machine, said machine including a rotor, bearing means in supportive relationship with said rotor, said rotor having journal means for riding on said bearing means, the improvement which comprises:
said bearing means comprising a hollow cylindrical bearing housing means, an upper bearing section means for maintaining said rotor in position, said upper bearing section means housed within said bearing housing means, a lower bearing section means for supporting said rotor, said lower bearing section means including a lower bearing shell having a U-shaped cross-section, said lower bearing shell housed within said bearing housing means, a pair of rockable pedestal journal support members, said journal support members positioned between said journal portions of said rotor and said lower bearing shell, said journal support members including an inner journal portion in close proximity to said journal means and an outer curved portion in close proximity to said lower bearing shell, said journal support members having a first pocket means therein proximate said outer curved portion, said lower bearing shell proximate the inner surface thereof having a second pocket means disposed therein in alignment with said first pocket means, said lower bearing shell proximate the outer surface thereof having a first channel means axially disposed therein in radial alignment with said second pocket means, said housing means proximate the inner surface thereof having a V-shaped axial groove means therein radial alignment with said second pocket means, a first key means disposed within said first pocket means and said second pocket means of substantially fixing the position of each of said journal support members with respect to said lower bearing shell and said journal portions, said first key means including a curved surface, said journal support member riding on said curved surface of said first key means, a second key means disposed within said first channel means and said V-shaped groove means for providing ease in elevation adjustment of said rotor and for preventing said lower bearing shell from rotating.

2. The dynamoelectric machine of claim 1, wherein said upper bearing section means comprises an upper shell having a U-shaped cross section, the inner surface of said upper bearing shell in close proximity to said journal means of said rotor.

3. The dynamoelectric machine of claim 2, wherein said outer housing means proximate the inner surface thereof having second channel means therein, said upper bearing shell proximate the outer surface thereof having third channel means therein, a third key means disposed within said second channel means and said third channel means for preventing movement of said upper bearing shell within said housing means.

4. The dynamoelectric machine of claim 1, wherein said second key means has a substantially triangular cross-section.

5. The dynamoelectric machine of claim 1, wherein said bearing means further comprises shim means disposed between said second key means and said lower bearing shell for raising said rotor to any desired position.

6. The dynamoelectric machine of claim 1, wherein said curved surface of said first key means is spherical.

7. The dynamoelectric machine of claim 1, wherein said second key means has threaded aperture means therein for permitting said second key to be engaged by a bolt so that said second key means may be easily removed when installing said shim means.

8. The dynamoelectric machine of claim 1, bearing means further comprising flat disk means disposed between said curved surface of said first key means and said journal support member.

9. The dynamoelectric machine of claim 1, wherein each of said journal support members further comprises an inner bearing shoe in close proximity said journal portion of said rotor, an outer bearing shoe support for supporting said inner bearing shoe, said inner bearing shoe having said inner journal portion on the inner surface therein.

10. Bearing means for a dynamoelectric machine rotor, said rotor having journal means for riding on said bearing means, said bearing means comprising a hollow cylindrical bearing housing means, an upper bearing section means for maintaining said rotor in position, said upper bearing section means housed within said bearing housing means, a lower bearing section means including a lower bearing shell having a U-shaped cross section, said lower bearing shell housed within said bearing housing means, a pair of rockable pedestal journal support members, said journal support members positioned between said journal means and said lower bearing shell, said journal support members including an inner journal portion and an outer curved portion in close proximity to said lower bearing shell, said journal support members having first pocket means therein proximate said outer curved portion, said lower bearing shell proximate the inner surface thereof having a second pocket means disposed therein in alignment with said first channel means, said lower bearing shell proximate the outer surface thereof having a third pocket means disposed therein in alignment with said second pocket means, said housing means proximate the inner surface thereof having a V-shaped groove means therein aligned with said third pocket means, a first key means disposed within said first pocket means and said second pocket means for substantially fixing the position of each of said journal support members with respect to said lower bearing shell and said journal means, said first key means including a curved surface, said journal support member riding on said curved surface of said first key means, a second key means disposed within said third pocket means and said V-shaped groove means for providing ease in elevation adjustment of said rotor and for preventing said lower bearing shell from rotating.

11. The bearing means of claim 10, wherein said upper bearing section means comprises an upper shell having a U-shaped shell cross section, the inner surface of said upper bearing shell in close proximity to said journal means.

12. The bearing means of claim 10, wherein said outer housing means proximate the inner surface thereof having first channel means therein, said upper bearing shell proximate the outer surface thereof having second channel means therein, a third key means disposed within said first channel means and said second channel means, for preventing movement of said upper bearing shell within said housing means.

13. The bearing means of claim 10, wherein said second key means has a substantially triangular cross section.

14. The bearing means of claim 10, wherein said bearing means further comprises shim means disposed between said second key means and said lower bearing shell for raising said rotor to the desired position.

15. The bearing means of claim 10, wherein said curved surface of said first key means is spherical.

16. The bearing means of claim 14, wherein said second key means has threaded aperture means therethrough for permitting said second key means to be removed when installing said shim means.

17. The bearing means of claim 10, wherein said lower bearing shell proximate the inner surface thereof has fixed groove means adjacent said second pocket means.

18. The bearing means of claim 17, further comprising oil blockage seal means substantially disposed within said axial groove means.

19. The bearing means of claim 18, wherein said oil blockage seal means has a triangular cross-section.

20. The bearing means of claim 19, wherein said journal support members have tangential oil channels therethrough, whereby said oil blockage seal prevents circumfernetial oil flow between said journal support members and said lower bearing shell to enhance oil flow through said tangential channels to provide cooling for said inner journal portion.

* * * * *